Sept. 25, 1928.                                              1,685,543
M. J. LACKNER
BURNER FOR REGENERATIVE FURNACES
Filed Feb. 24, 1926
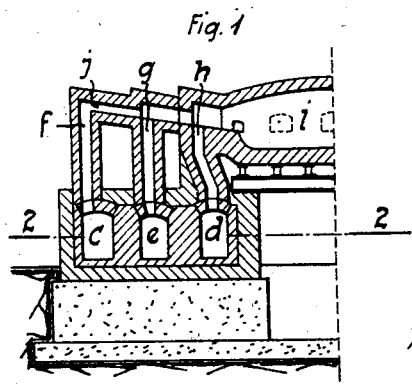
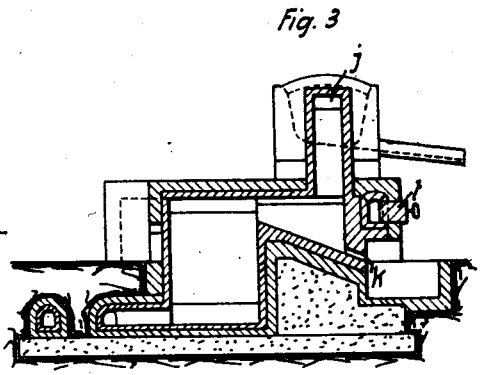
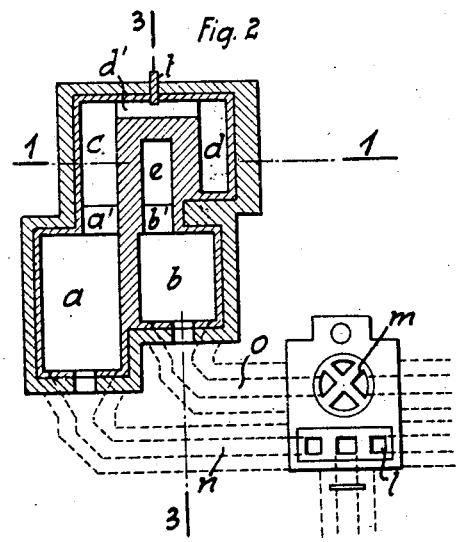
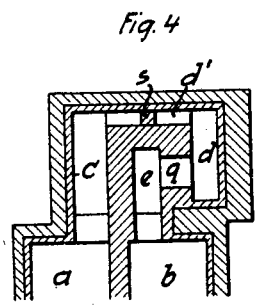
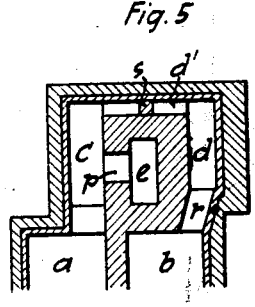
Inventor:
Michael Johann Lackner
By
Attorney.

Patented Sept. 25, 1928.

1,685,543

UNITED STATES PATENT OFFICE.

MICHAEL JOHANN LACKNER, OF DORTMUND, GERMANY.

BURNER FOR REGENERATIVE FURNACES.

Application filed February 24, 1926, Serial No. 90,356, and in Germany February 21, 1925.

My invention relates to the construction of a regenerative reverberatory furnace for heating and melting in which an intimate mixing of the fuel gas with the combustion air is produced by arranging in the furnace end three flues behind each other, of which one conveys one medium and the two others convey the other medium, and by increasing the section of said flues towards the furnace chamber according to the required flowing speed of the mixture of gas and air. Each flue is provided with a slag pocket for separating the slag particles contained in the spent gases, three slag pockets being located one behind the other. The slag pockets containing the same medium are connected with each other by flues causing the medium to flow round from one pocket to the other.

In the accompanying drawing the object of my invention is represented wherein;

Fig. 1 is a longitudinal vertical sectional view of the end of an open hearth furnace.

Fig. 2 is a horizontal sectional view of the furnace end on the line 2—2 of Fig. 1.

Fig. 3 is a transverse sectional view of the furnace end on the line 3—3 of Fig. 2, and Figs. 4 and 5 each represent a part of the horizontal sectional view shown in Fig. 2, for two different combinations of the flues.

Below the charging floor level, on each side of the furnace two regenerating chambers $a$ and $b$ are arranged for heating the fuel gas and combustion air, and relatively for utilizing the heat of the waste gases. From the first chamber $a$, a flue $a'$ leads to the slag pocket $c$ and another flue $d'$ transversely positioned leads from the latter to the slag pocket $d$. From the other chamber $b$ the flue $b'$ leads to the slag pocket $e$. These slag pockets are placed underneath the vertical flues $f$, $g$ and $h$ which are connected relatively with the slag pockets $c$, $e$ and $d$. On their upper end the flues $f$, $g$ and $h$ are connected with each other and with said furnace chamber by the flue $j$ directed towards the melting chamber $i$, the section of said flue $j$ being made to gradually increase towards the furnace chamber in accordance with the speed of the gas and air mixture which is to answer to the ignition speed of the heated fuel gases. By the tap holes $k$ the slags collected may be discharged. The distribution of the fuel gas and air is performed by reversing valves $l$ and $m$ which, by the flues $n$ and $o$ are connected with the chambers $a$ and $b$ relatively. In the embodiment shown in Figures 1, 2 and 3 as an instance the chamber $b$, the slag pocket $e$ and the flue $g$ convey the fuel gas, whereas the chamber $a$, the slag pockets $c$ and $d$, and the flues $f$ and $h$ convey the combustion air.

In order to facilitate the application of different furnace end or burner constructions without requiring essential structural alterations of the furnace, there are, in my invention, provided flues $p$ and $q$ across the walls between the central slag pocket $e$ and the outer pockets $c$ and $d$, and furthermore a flue $r$ from the chamber $b$ to the slag pocket $d$ which can be opened or closed according to Figs. 4 and 5, as it may be required. The transverse flue $d'$ then is to be intercepted by a block $s$. This block may also be changed into a slide valve $t$ and then, in the embodiment shown in Figs. 1, 2 and 3, may be used as a device for regulating the supply of the mediums.

What I claim is:

1. A burner construction for regenerative furnaces comprising three flues for conveying the combustion air and fuel gases; a slag pocket for each flue for collecting the slag particles which may be carried in the fuel gases; a mixing flue for connecting the flues with each other and with a furnace chamber, said mixing flue increasing in size toward the furnace chamber; and means for interconnecting two of the slag pockets.

2. A burner construction for regenerative furnaces comprising a pair of regenerative chambers; three flues; a slag pocket for each flue, said pockets and flues being in communication with the chambers; a mixing flue for connecting the flues with each other and with a furnace chamber and increasing in size toward the furnace chamber, said pockets being adapted to collect the slag particles which may be carried in the fuel gases and the flues and pockets being adapted to convey the combustion air and fuel gases from the regenerative chambers to the furnace; means for interconnecting two of the slag pockets; and means for regulating the supply of air and gases.

In testimony whereof I affix my signature.

MICHAEL JOHANN LACKNER.